United States Patent
Sano et al.

(10) Patent No.: US 7,472,958 B2
(45) Date of Patent: Jan. 6, 2009

(54) SEAT SWIVELING DEVICE OF A VEHICLE

(75) Inventors: Yasumasa Sano, Kariya (JP); Kazushi Kamiya, Kariya (JP)

(73) Assignee: Kabushiki Kaisha Toyota Jidoshokki, Kariya-Shi (JP)

( * ) Notice: Subject to any disclaimer, the term of this patent is extended or adjusted under 35 U.S.C. 154(b) by 0 days.

(21) Appl. No.: 11/786,576

(22) Filed: Apr. 11, 2007

(65) Prior Publication Data

US 2007/0246987 A1  Oct. 25, 2007

(30) Foreign Application Priority Data

Apr. 13, 2006  (JP) .............................. P2006-110405

(51) Int. Cl.
*B60N 2/14* (2006.01)
(52) U.S. Cl. .............................. 297/344.22; 297/344.21; 297/344.24
(58) Field of Classification Search ............ 297/344.21, 297/344.22, 344.24
See application file for complete search history.

(56) References Cited

U.S. PATENT DOCUMENTS

| | | | | |
|---|---|---|---|---|
| 2,148,187 A | * | 2/1939 | Burnham ..................... | 248/425 |
| 2,266,200 A | * | 12/1941 | Hedley ................ | 297/344.22 X |
| 2,822,858 A | * | 2/1958 | Mussler ............... | 297/344.24 X |
| 2,992,852 A | * | 7/1961 | Loofbourrow et al. . | 297/344.24 X |
| 3,013,837 A | * | 12/1961 | Pessl et al. .......... | 297/344.21 X |
| 3,066,979 A | * | 12/1962 | Pitts et al. ........... | 297/344.24 X |
| 3,104,911 A | * | 9/1963 | James et al. ................. | 296/68 |
| 4,417,715 A | * | 11/1983 | Edwards ............. | 297/344.22 X |
| 5,474,353 A | * | 12/1995 | Koester et al. ...... | 297/344.21 X |
| 5,482,354 A | * | 1/1996 | Gryp ..................... | 297/344.22 |
| 6,027,170 A | * | 2/2000 | Benz et al. ............. | 297/344.21 |
| 6,302,483 B1 | * | 10/2001 | Ricaud et al. ....... | 297/344.22 X |
| 6,513,872 B2 | * | 2/2003 | Bar .................... | 297/344.22 X |
| 6,981,746 B2 | * | 1/2006 | Chung et al. ........... | 297/344.21 |
| 7,219,961 B2 | * | 5/2007 | Priepke et al. ......... | 297/344.21 |
| 2006/0226685 A1 | * | 10/2006 | Priepke et al. ......... | 297/344.24 |

FOREIGN PATENT DOCUMENTS

| | | |
|---|---|---|
| DE | 40 15 966 A1 | 6/1991 |
| EP | 1 386 777 A1 | 2/2004 |
| JP | 10-109575 | 4/1998 |
| JP | 10109575 | 4/1998 |

OTHER PUBLICATIONS

European Search Report dated Aug. 6, 2007 issued by European Patent Office for application No. 07105951.3-2424.

* cited by examiner

*Primary Examiner*—Rodney B. White
(74) *Attorney, Agent, or Firm*—Morgan & Finnegan, LLP

(57) ABSTRACT

A seat swiveling device of a vehicle comprises a stationary base, a movable base, a vehicle seat assembly and a swing lever. The movable base has a second pivot shaft for supporting the swing lever so that the swing lever is pivoted. The stationary base has a guide hole for defining a range in which the movable base is pivotable. The swing lever has an elongated hole in which the second pivot shaft is inserted and a locating lug which is guided along the guide hole. The guide hole has a recessed portion with which the locating lug is engaged by pivoting the swing lever thereby to fix the movable base to the stationary base at a predetermined position. The swing lever is movable relative to the second pivot shaft in accordance with the shape of the elongated hole.

9 Claims, 6 Drawing Sheets

SEAT SWIVELING DEVICE OF A VEHICLE

BACKGROUND OF THE INVENTION

The present invention relates to a device for swiveling a vehicle seat in a horizontal plane.

The seat swiveling device for use in a vehicle is disclosed in Japanese Utility Model Application Publication No. 5-56582 and the Japanese Unexamined Patent Application Publication No. 10-109575. The latter shows a mechanism for adjusting the swiveling of the vehicle seat as a seat swiveling device for a vehicle.

Such an adjusting mechanism includes a lower base which is fixed to the floor of a vehicle compartment and has an annular support portion, an upper base which is slidably and pivotably mounted on the annular support portion of the lower base and has at its center an opening for fixing therein a vehicle seat assembly, and a holder which holds the upper base in such a way that the upper base is slidable relative to the annular support portion of the lower base. The holder has a cylindrical portion having formed therethrough plural holes which are arranged circumferentially in the cylindrical portion at a predetermined spaced intervals. A lock plate is pivotably mounted to the upper base by a pivot shaft. The lock plate has plural teeth which are engageable with holes in the holder.

In other words, the lock plate performs the function of making the upper base rotatable relative to the lower base or locked to the lower base so that the upper base is unrotatable relative to the lower base. The lock plate is mounted to the lower base by and pivoted about the pivot shaft which is provided on the lower base and has a circular cross section. For that reason, the lock plate has formed therein a shaft hole of a shape of a perfect circle having substantially the same diameter as the pivot shaft. In such an arrangement of the lock plate, therefore, the teeth are moved along a path of an arc centered on the pivot shaft. The teeth are formed in a direction that is substantially the same as the direction tangential to the above path of an arc, and the distance between the center of the pivot shaft and the lateral sides of the engaging teeth is constant.

According to the relative art, the shaft hole in the lock plate is of a perfect circle whose diameter corresponds to the diameter of the pivot shaft, and the distance between the center of the pivot shaft and the lateral sides of the teeth is constant. Therefore, the teeth tend to be engaged with the hole such that only one lateral side of the teeth contacts with one lateral side of the hole. For engaging the teeth and holes such that lateral sides of the teeth are in contact with the lateral sides of the hole with no gap therebetween, the shape of the hole has to correspond exactly to the shape of the teeth and the teeth and their holes have to be precisely positioned relative to each other. Thus, the teeth and the hole need to be formed with high accuracy and the teeth need to be accurately positioned with respect to the teeth in turning the vehicle seat assembly. In the conventional art, the engaging of the teeth of the swing lever cannot be brought into snug contact with the hole of the upper base with no gap therebetween by relatively easy operation.

Therefore, an object of the present invention is to provide a seat swiveling device in a vehicle which brings the teeth or a locating lug of the swing lever into contact with the hole of the upper base or a movable base with no gap therebetween while permitting relatively easy operation for the engagement.

SUMMARY OF THE INVENTION

In accordance with an aspect of the present invention, a seat swiveling device of a vehicle has a vehicle body. The seat swiveling device comprises a stationary base secured to the vehicle body, a movable base connected to the stationary base through a first pivot shaft, a vehicle seat assembly mounted on a top face of the movable base and a swing lever changing locking and unlocking positions of the movable base relative to the stationary base. The movable base has a second pivot shaft for supporting the swing lever so that the swing lever is pivoted. The stationary base has a guide hole for defining a range in which the movable base is pivotable. The swing lever has an elongated hole in which the second pivot shaft is inserted and a locating lug which is guided along the guide hole. The guide hole has a recessed portion with which the locating lug is engaged by pivoting the swing lever thereby to fix the movable base to the stationary base at a predetermined position. The swing lever is movable relative to the second pivot shaft in accordance with the shape of the elongated hole.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiment together with the accompanying drawings in which:

DETAILED DESCRIPTION OF THE PREFERRED EMBODIMENT

Figure 1:
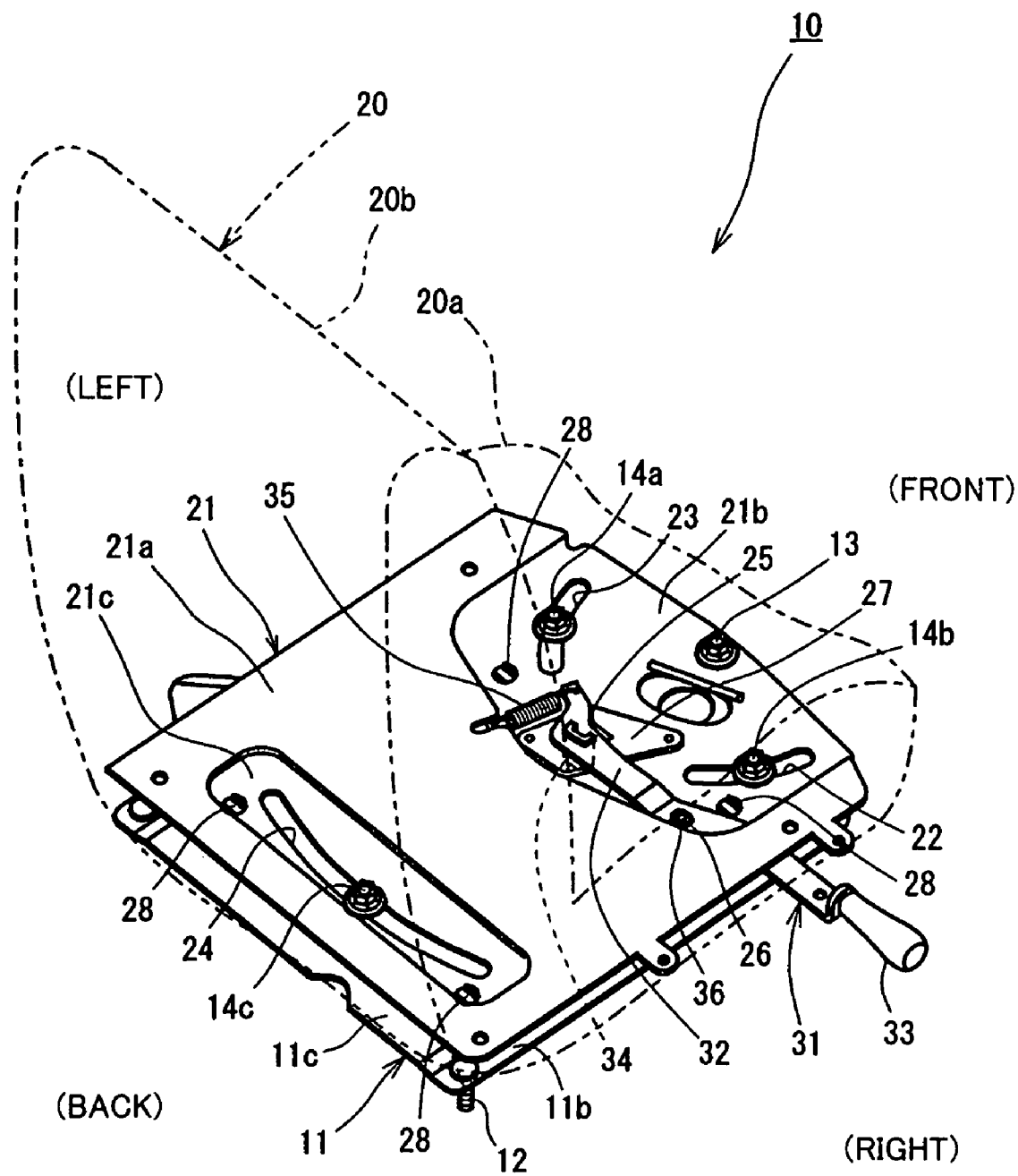
FIG. 1 is a perspective view showing a seat swiveling device of a vehicle according to a preferred embodiment of the present invention.

The following will describe a seat swiveling device in a vehicle according to a preferred embodiment of the present invention with reference to FIGS. 1 through 6. The following description covers a seat swiveling device as applied to a forklift truck as an industrial vehicle. FIG. 1 is a perspective view showing the seat swiveling device according to the preferred embodiment of the present invention.

Referring to FIG. 1, the seat swiveling device 10 for a vehicle has a stationary base 11 which is secured to the vehicle body and a movable base 21 which is held to the top face of the stationary base 11 by a pivot shaft 13 for pivoting about the pivot shaft 13 relative to the stationary base 11. A vehicle seat assembly 20 is mounted on the top face of the movable base 21 so that the vehicle seat assembly 20 is swiveled or oriented in different directions as the movable base 21 is pivoted in a horizontal plane about the pivot shaft 13.

The vehicle seat assembly 20 for a vehicle operator includes a seat 20a and a backrest 20b. The movable base 21 has a swing lever 31 that is operated by the operator on the vehicle seat assembly 20 for changing the movable base 21 between its locked and unlocked positions relative to the stationary base 11. In unlocked position, the seat swiveling device of the vehicle 10 changes the direction of the vehicle seat assembly 20 by the operation of the swing lever 31 by the operator.

The following will describe each part of the seat swiveling device in detail. In the following description, the references to directions or locations such as front, rear, right, and left as viewed from a vehicle operator seated on the seat 20a of the seat assembly 20 are used, as indicated in FIG. 1.

Figure 2:
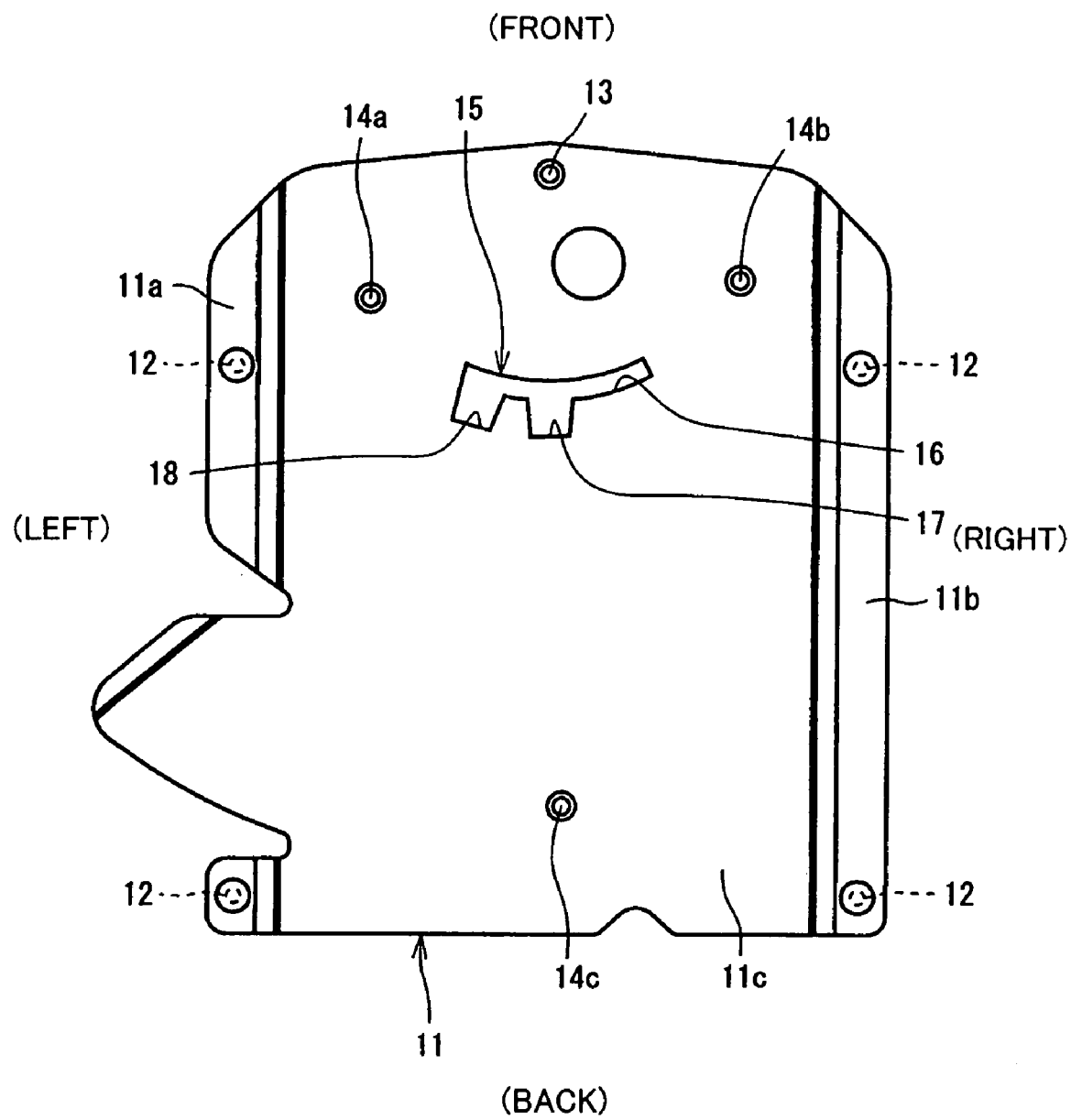
FIG. 2 is a plan view showing a stationary base in the seat swiveling device of a vehicle.

As shown in FIG. 2, the stationary base 11 is made of a bent metal plate having punched holes. The stationary base 11 has contact portions 11a and 11b which are formed by bending the opposite lateral end portions of the stationary base 11 along the longitudinal direction thereof. Fixing members 12 are provided in the front and rear portions of each of the contact portions 11a and 11b for fixing the stationary base 11 to the vehicle body. The stationary base 11 has a horizontal portion 11c which is formed between the opposite contact portions 11a and 11b. The horizontal portion 11c is slightly raised from the contact portions 11a and 11b, and the top face of the horizontal portion 11c is flat. The pivot shaft 13 is provided upstanding at the center on the top face of the horizontal portion 11c adjacent to the front end thereof. The pivot shaft 13 pivotally holds the movable base 21 to function as a pivot for the movable base 21.

Shafts 14a through 14c which are similar to the pivot shaft 13 are provided on the top face of the horizontal portion 11c. These shafts 14a through 14c are inserted in guide holes 22 through 24, respectively, which are formed in the movable base 21 as shown in FIG. 1. As shown in FIG. 2, the shaft 14a is provided adjacent to the contact portion 11a, the shaft 14b adjacent to the contact portion 11b and the shaft 14c adjacent to the rear edge of the horizontal portion 11c, respectively.

A guide hole 15 is formed in the horizontal portion 11c of the stationary base 11 which defines the range in which the movable base 21 is pivotable. The guide hole 15 received therein a locating lug 34 of the swing lever 31 and has an arcuate portion 16 and recessed portions 17 and 18 engageable with the locating lug 34. The arcuate portion 16 is formed behind the pivot shaft 13 in the shape of a circular arc which is centered at the pivot shaft 13. The recessed portions 17 and 18 of the guide hole 15 extend rearwardly from predetermined positions of the arcuate portion 16. The arcuate portion 16 of the guide hole 15 limits the pivoting range of the movable base 21, that is about 17 degrees in clockwise direction and about 25 degrees in counter-clockwise direction from the center position (which will be described later) of the movable base 21 as viewed in plan view of FIG. 2.

The recessed portions 17 and 18 of the guide hole 15 are provided at the predetermined positions of the arcuate portion 16 in the form of cuts extending rearwardly. The recessed portions 17 and 18 of the preferred embodiment have the substantially same and complementary shape as the locating lug 34. The recessed portion 17 is provided at such a position that the movable base 21 is located at the aforementioned center position where the seat assembly 20 faces straightforward when the locating lug 34 is engaged with the recessed portion 17. The recessed portion 18 is provided at a position that is spaced by about 17 degrees in clockwise direction from the position of the recessed portion 18. In other words, the recessed portion 17 serves to hold the movable base 21 at the center position, and the recessed portion 18 serves to hold the movable base 21 at the position that is spaced by 17 degrees in clockwise direction from the center position. The recessed portions 17 and 18 are wedge-shaped so that the widths of the recessed portions 17 and 18 are narrowed rearwardly or toward the ends thereof. The engagement of the locating lug 34 with the recessed portions 17 and 18 causes the movable base 21 to be fixed to the stationary base 11.

Figure 3:
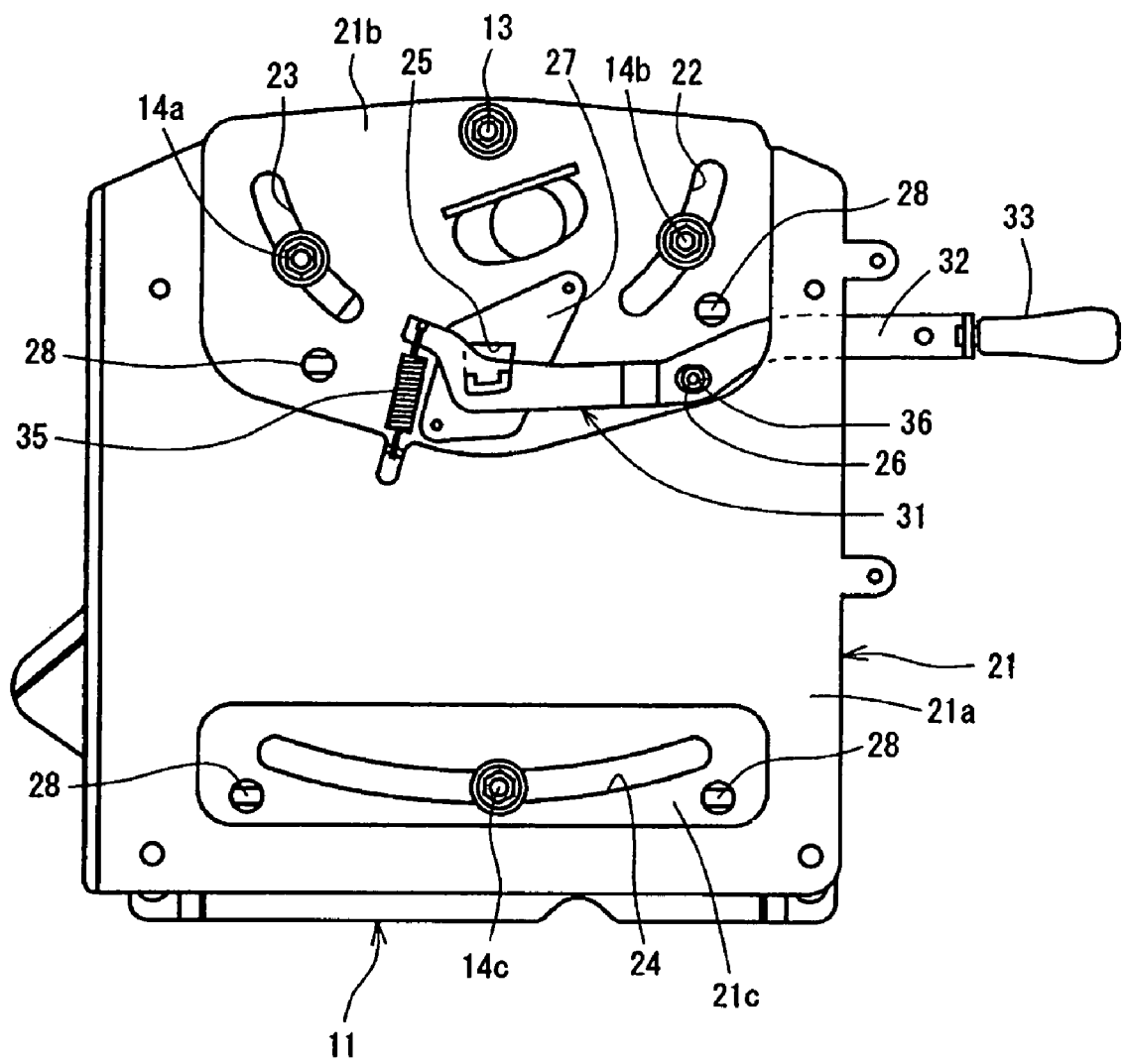
FIG. 3 is a plan view showing the seat swiveling device of a vehicle.

The movable base 21 is a plate-like member connected to the stationary base 11 through the pivot shaft 13. As shown in FIGS. 1 and 3, the movable base 21 of the preferred embodiment has a seat base portion 21a on which the vehicle seat assembly 20 is to be mounted and lower portions 21b and 21c which are formed lower than the seat base portion 21a. As shown in FIG. 3, the lower portions 21b, 21c are formed in the front and the rear of the movable base 21, respectively. A shaft hole for receiving therethrough the pivot shaft 13 (not shown in the drawings) and guide holes 22 and 23 through which the shafts 14a and 14b are inserted are formed in the front of the lower portion 21b (hereinafter referred to as "front lower portion") of the movable base 21. A guide hole 24 through which the shaft 14c at the rear of the movable base 21 is inserted is formed in an arc-shape in the rear of the lower portion 21c (hereinafter referred to as "rear lower portion") of the movable base 21.

The guide holes 22 through 24 in the front lower portion 21b and rear lower portion 21c are formed in the shape of arc of a circle whose center corresponds to the pivot shaft 13. The lengths of the guide hole 22 through 24 are determined in accordance with the length of the guide hole 15 in the stationary base 11 which defines the pivoting range of the movable base 21. With the movable base 21 connected to the stationary base 11, retaining nuts are attached to the tops of the respective pivot shaft 13 and the shafts 14a through 14c. A hole 25 is formed through the front lower portion 21b for receiving therein the locating lug 34 of the swing lever 31, and a pivot shaft 26 is provided in the front lower portion 21b for pivotally supporting the swing lever 31.

The through hole 25 defines the range in which the swing lever 31 is pivotable. According to the preferred embodiment, the through hole 25 is provided such that the position of engagement of the locating lug 34 with the recessed portions 17 and 18 and the arcuate portion 16 in the guide hole 15 is changed. A reinforcement plate 27 is attached to the movable base 21 at a position adjacent to the through hole 25 for preventing the deformation of the through hole 25 due to the engagement of the locating lug 34 with the hole 25. The reinforcement plate 27 has formed a hole therethrough at a position corresponding to the hole 25 in the movable base 21. The pivot shaft 26 supports the swing lever 31 and is located apart from the through hole 25. According to the preferred embodiment, rollers 28 are mounted to the movable base 21 to provide smooth pivoting of the movable base 21 relative to the stationary base 11.

Figure 4:
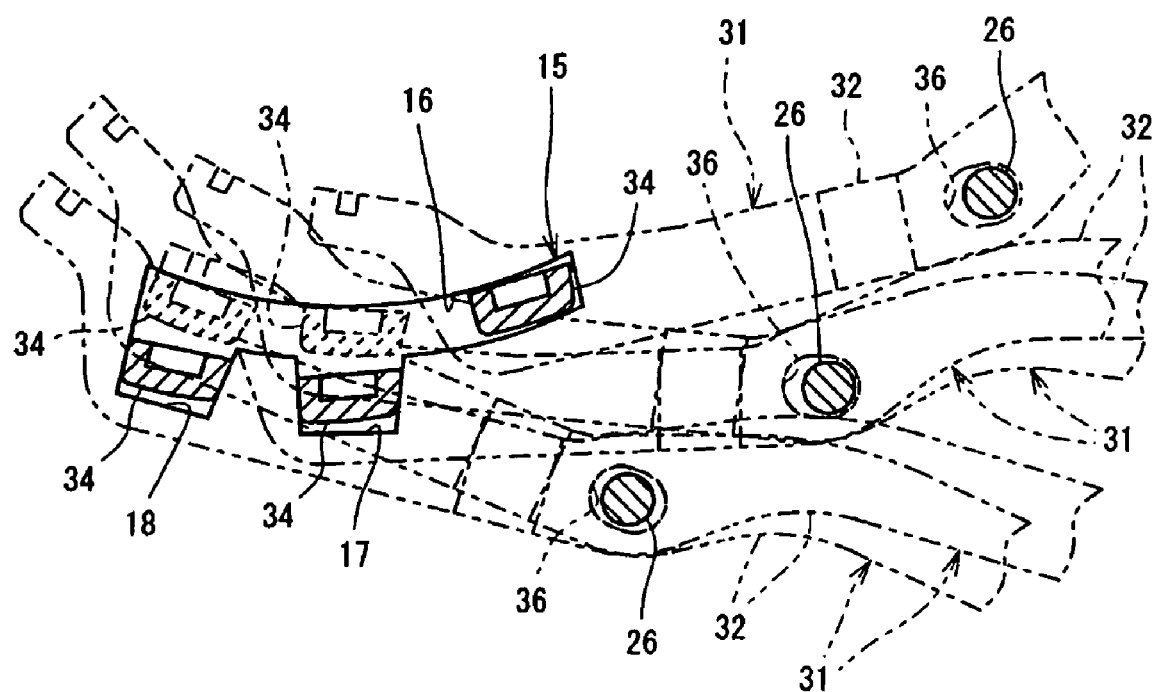
FIG. 4 is a cross sectional plan view showing relationship between an swing lever and a guide hole.

The swing lever 31 is pivotally mounted to the movable base 21 through the pivot shaft 26. As shown in FIG. 3, the swing lever 31 has a lever body 32 and a grip 33. The lever body 32 is pivotally mounted on the pivot shaft 26, and one end of the lever body 32 extends rightward out of the movable base 21. The grip 33 is provided at a position of the end of the lever body 32 or one end of the swing lever 31 as a first end. The other end of the lever body 32 extends over the hole 25 and the locating lug 34 is provided at a position of the other end of the lever body 32 adjacent to the hole 25. The locating lug 34 is inserted through the through hole 25 of the movable base 21 and further in the guide hole 15 of the stationary base 11 as shown in FIG. 4. The direction of the center axis of the locating lug 34 is substantially the same as the direction in which the swing lever 31 is pivoted, and the shape of the lateral sides of the locating lug 34 is substantially same as the shape of the lateral sides of the recessed portions 17 and 18. By operating the grip 33 of the swing lever 31, the locating lug 34 is fit into the recessed portions 17 and 18 or moved along the arcuate portion 16 of the guide hole 15, thereby causing the movable base 21 to pivot in either leftward or rightward direction.

A coil spring 35 as an urging means is connected between the other end of the swing lever 31 as the second end and the movable base 21 for urging the locating lug 34 rearwardly or toward the recessed portions 17 or 18. An elongated hole 36 as a shaft hole in which the pivot shaft 26 inserted is formed at a middle of the lever body 32, and the longitudinal direction of the elongated hole 36 is the substantially same as the direction in which the locating lug 34 moves along the guide hole 15. This allows the swing lever 31 to move for a distance corresponding to the clearance in the elongated hole 36 when the swing lever 31 is pivoted against the urging force of the coil spring 35 and the locating lug 34 is positioned at the arcuate portion 16 of the guide hole 15. Providing the elongated hole 36 in the lever body 32, operations of engaging or disengaging the locating lug 34 with or from the recessed portion 17, 18 of the guide hole 15 by means of the swing lever 31 in moving the locating lug 34 in the guide hole 15 can be performed smoothly.

The following will describe the operation of the seat swiveling device of a vehicle according to the preferred embodiment. In the normal position of the vehicle seat assembly 20 in a forklift truck, as shown in FIG. 3, the movable base 21 is not pivoted relative to the stationary base 11 or the seat assembly 20 on the movable base 21 faces straightforward. In this position, the locating lug 34 of the swing lever 31 is secured in the recessed portion 17 and, therefore, the movement of the movable base 21 in the pivoting direction is restricted and the vehicle seat assembly 20 faces straightforward. In the normal position of the seat assembly 20, the spring force of the coil spring 35 is applied to the swing lever 31 as a force in the direction in which the locating lug 34 is engaged with the recessed portion 17. Thus, when the swing lever 31 is not operated, the locating lug 34 is kept engaged with the recessed portion 17. The swing lever 31 may move relative to the pivot shaft 26 for a distance corresponding to the clearance in the elongated hole 36. The recessed portion 17 is wedge-shaped with its width narrowed toward its bottom, so that the locating lug 34 contacts with recessed portion 17 with no gap therebetween.

The following will describe the case when the direction of the vehicle seat assembly 20 is changed. When the vehicle seat assembly 20 is pivoted clockwise direction as viewed, for example, in FIG. 3, the operator's body is turned rightward and this is convenient for the operator to check for the rear of the vehicle body when the forklift truck is driven backward. For disengagement the locating lug 34 from the recessed portion 17, the swing lever 31 is operated such that the locating lug 34 which is then engaged with the recessed portion 17 is moved toward the arcuate portion 16. According to the preferred embodiment, for disengaging the locating lug 34 from the recessed portion 17, the grip 33 is moved backward so that the swing lever 31 is pivoted against the urging force of the coil spring 35. In this operation of the swing lever 31 for disengaging locating lug 34 from the recessed portion 17, the swing lever 31 is pivoted about the pivot shaft 26 and, therefore the locating lug 34 is moved along a path of a circular arc whose center is the pivot shaft 26.

However, it is difficult for the locating lug 34 to be released smoothly from the recessed portion 17 because part of the shape of the locating lug 34 and the recessed portion 17 does not correspond to the circular arc of the path.

In the preferred embodiment, since the swing lever 31 has an elongated hole 36 through which the pivot shaft 26 is inserted and, therefore, the swing lever 31 is movable relative to the pivot shaft 26, the locating lug 34 can be released easily from the recessed portion 17. This is because the distance between the pivot shaft 26 serving as the pivot and the locating lug 34 serving as the acting point is changed according to the variable clearance between the elongated hole 36 and the pivot shaft 26. In the preferred embodiment of the present invention, the difficulty in releasing the locating lug 34 from the recessed portion 17 because of failure in complete correspondence of circular arcs thereof is solves by the provision of the elongated hole 36 along which the swing lever 31 is movable relative to the movable base 21.

As shown in FIG. 4, when the locating lug 34 is fully released from the recessed portion 17, the locating lug 34 is positioned in the arcuate portion 16 of the guide hole 15 at a position where the locating lug 34 faces the recessed portion 17 as indicated by two-dot chain line. In this position, the swing lever 31 is then turned in clockwise direction as viewed from the top or pushed leftward thereby to pivot the movable base 21 in clockwise direction. On the other hand, the swing lever 31 is turned in counter-clockwise direction or pulled rightward to pivot the movable base 21 counter-clockwise. In pivoting the movable base 21 in counter-clockwise direction, the locating lug 34 is positioned facing the recessed portion 18 which is used for holding the movable base 21 at a position where the movable base 21 has turned in counter-clockwise direction for a predetermined distance from the aforementioned center position. In FIG. 4, the locating lug 34 in this position is shown by two-dot chain line at a position where it faces the recessed portion 18. Releasing the swing lever 31, the swing lever 31 is moved by the urging force of the coil spring 35 in the direction which causes the locating lug 34 to be engaged with the recessed portion 18.

Figure 5:
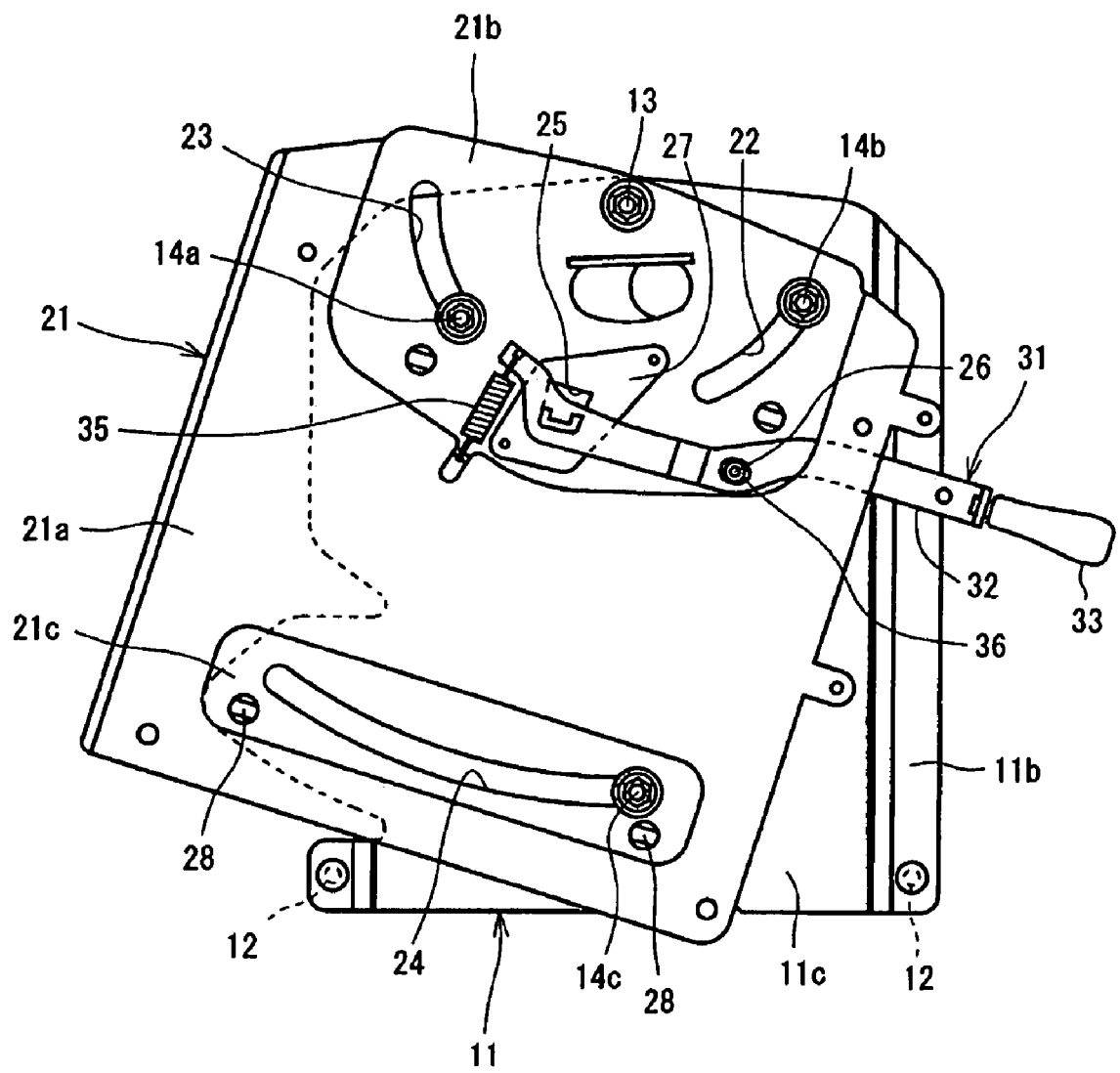
FIG. 5 is a plan view showing a movable base pivoting to the left side of the vehicle body.

Then, the swing lever 31 is moved relative to the pivot shaft 26 as needed thereby to facilitate the engagement of the locating lug 34 with recessed portion 18. In the engagement of the locating lug 34 with the recessed portion 18 as shown in FIG. 4, the movable base 21 is pivoted clockwise relative to the stationary base 11 as shown in FIG. 5 and both lateral sides of the locating lug 34 are in contact with those of the recessed portion 18 with no gap formed therebetween. As a result, the vehicle seat assembly 20 is pivoted about an angle of 17 degrees in clockwise direction relative to an operator's platform facing toward of the vehicle body from the center position. Thus, the front of the body of the operator seated on operator's seat is turned rightward, and the vehicle seat assembly 20 which has been pivoted clockwise remains at this position unless the swing lever 31 is operated again.

Figure 6:
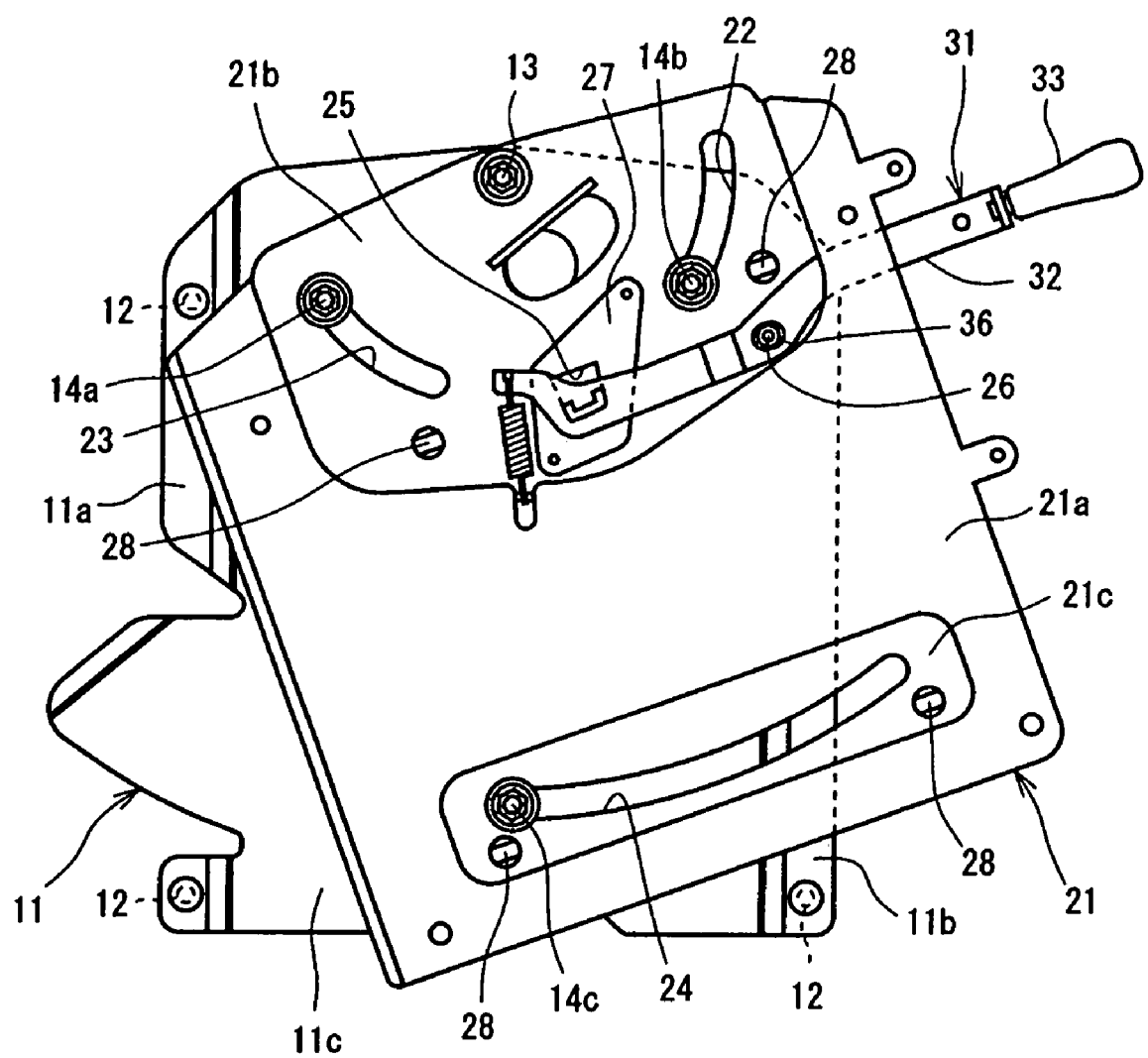
FIG. 6 is a plan view showing a movable base pivoting to the right side of the vehicle body.

Referring to FIG. 6, since there is no recessed portion in the arcuate portion 16 in the range of the guide hole 15 corresponding to the counter-clockwise pivoting of the movable base 21 from its center position, the movable base 21 which have been pivoted counter-clockwise from the center position cannot be maintained in its pivoted position without continuing to hold the swing lever 31. In this position, the front of the seated operator's body is turned left. When the operator gets out of the operator's platform, the counter-clockwise pivoting of the vehicle seat assembly 20 makes the front of the operator's body to face leftward, which makes it easy for the operator to get out of the vehicle.

According to the seat swiveling device of a vehicle of the preferred embodiment, the following effects are achieved.

(1) The swing lever 31 is movable relative to the pivot shaft 26 which is inserted through the elongated hole 36. Thus, even if the recessed portions 17 and 18 and locating lug 34 are made with large tolerances, the movement of the swing lever 31 relative to the pivot shaft 26 makes it easy for the locating lug 34 to be fitted in the recessed portions 17 and 18 with no gap formed therebetween and also for the locating lug 34 to be disengaged from the recessed portions 17 and 18.

(2) The elongated hole 36 is formed so as to extend in substantially the same longitudinal direction as the guide hole 15 along which the engaging locating lug 34 is move. Thus, the locating lug 34 is moved along the guide hole 15 in positioning the engaging locating lug 34 relative to the recessed portions 17 and 18 and, therefore, the engagement of the locating lug 34 with the recessed portions 17 and 18 is facilitated.

(3) The locating lug 34 and the recessed portions 17 and 18 have the substantially same and complementary wedge shape, and the direction of the center axis of the locating lug 34 is the substantially same as the direction in which the swing lever 31 is pivoted. Thus, the locating lug 34 is fitted in the recessed portion 17 or 18 with no gap therebetween when the locating lug 34 is engaged with the recessed portion 17 or 18 by swinging the swing lever 31.

(4) The swing lever 31 is subjected to the urging force such that the locating lug 34 is urged toward the recessed portions 17 and 18 or rearwardly by the coil spring 35 as urging means. Thus, the engagement of the locating lug 34 with the recessed portions 17 and 18 is kept without any operation of the swing lever 31.

The present invention is not to be limited to the above embodiment but may be modified within the scope of the invention and it may be practiced in other various ways as exemplified below.

In the preferred embodiment, the swing lever 31 is operated by manipulation of the grip 33 of the swing lever 31 which is located on lateral side of the vehicle seat assembly 20. However, means for operating the swing lever 31 may be installed in an armrest which is provided on the vehicle seat. In this case, the operating means for the swing lever 31 such as the operating lever installed in the armrest is connected to the swing lever through a wire or the like. The swing lever is pivoted by operation of the operating means.

According to the preferred embodiment, after the locating lug 34 have been moved from the recessed portions 17 and 18 to the arcuate portion 16 by operation of the swing lever 31, the movable base 21 is pivoted by the operation of the grip 33 of the swing lever 31. However, the vehicle seat assembly 20 may be pivoted by twisting of the operator's body.

According to the above embodiment, the two recessed portions 17 and 18 are provided for holding the movable base 21 at the center or straightforward position and the position where the movable base 21 is pivoted clockwise for a predetermined angle from the center position. However, as long as at least the recessed portion 17 for the center position is provided, the number of the other recessed portions is not limited by the present invention.

According to the preferred embodiment, the spring force of the coil spring 35 is used as urging force. However, the urging force is not limited to the force of the coil spring 35. Any suitable means may be used for applying urging force the swing lever.

Therefore, the present examples and embodiment are to be considered as illustrative and not restrictive, and the invention is not to be limited to the details given herein but may be modified within the scope of the appended claims.

What is claimed is:

1. A seat swiveling device of a vehicle having a vehicle body comprising:
   a stationary base adapted to be secured to the vehicle body;
   a movable base connected to the stationary base through a first pivot shaft;
   a vehicle seat assembly mounted on a top face of the movable base; and
   a swing lever changing locking and unlocking positions of the movable base relative to the stationary base,
   wherein the movable base has a second pivot shaft for supporting the swing lever so that the swing lever is pivoted,
   wherein the stationary base has a guide hole for defining a range in which the movable base is pivotable,
   wherein the swing lever has an elongated hole in which the second pivot shaft is inserted and a locating lug which is guided along the guide hole,
   wherein the guide hole has a recessed portion with which the locating lug is engaged by pivoting the swing lever thereby to fix the movable base to the stationary base at a predetermined position, and
   wherein the swing lever is movable relative to the second pivot shaft in accordance with the shape of the elongated hole.

2. The seat swiveling device according to claim 1, wherein a longitudinal direction of the elongated hole is substantially the same as the direction in which the locating lug moves along the guide hole.

3. The seat swiveling device according to claim 1, wherein the recessed portion is wedge-shaped such that the width of the recessed portion is narrowed toward an end of the recessed portion, a direction of a center axis of the locating lug is substantially the same as a direction in which the swing lever is pivoted, and the recessed portion has substantially the same and complementary shape as the locating lug.

4. The seat swiveling device according to claim 1, wherein the guide hole has another recessed portion.

5. The seat swiveling device according to claim 1, wherein the guide hole has an arcuate portion.

6. The seat swiveling device according to claim 1, wherein the locating lug is located on a second end of the swing lever.

7. The seat swiveling device according to claim 1, wherein the movable base comprises an urging member for urging the swing lever by an urging force thereof in a direction in which the locating lug is engaged with the recessed portion, and engagement of the locating lug with the recessed portion is maintained by the urging force.

8. The seat swiveling device according to claim 7, wherein the urging member is a coil spring.

9. The seat swiveling device according to claim 8, wherein the coil spring is connected to the second end of the swing lever.

* * * * *